July 31, 1956 P. E. CLINGMAN 2,756,795
RESILIENT LOCKING AND SEALING WASHER
Filed June 20, 1951
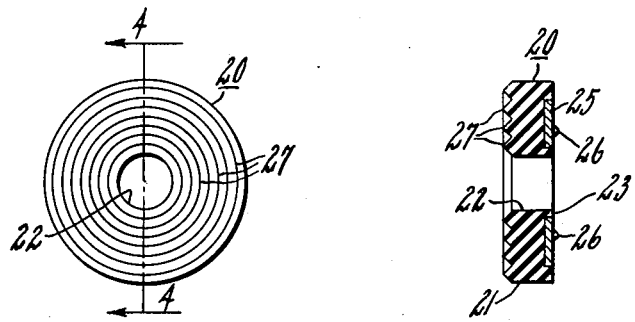
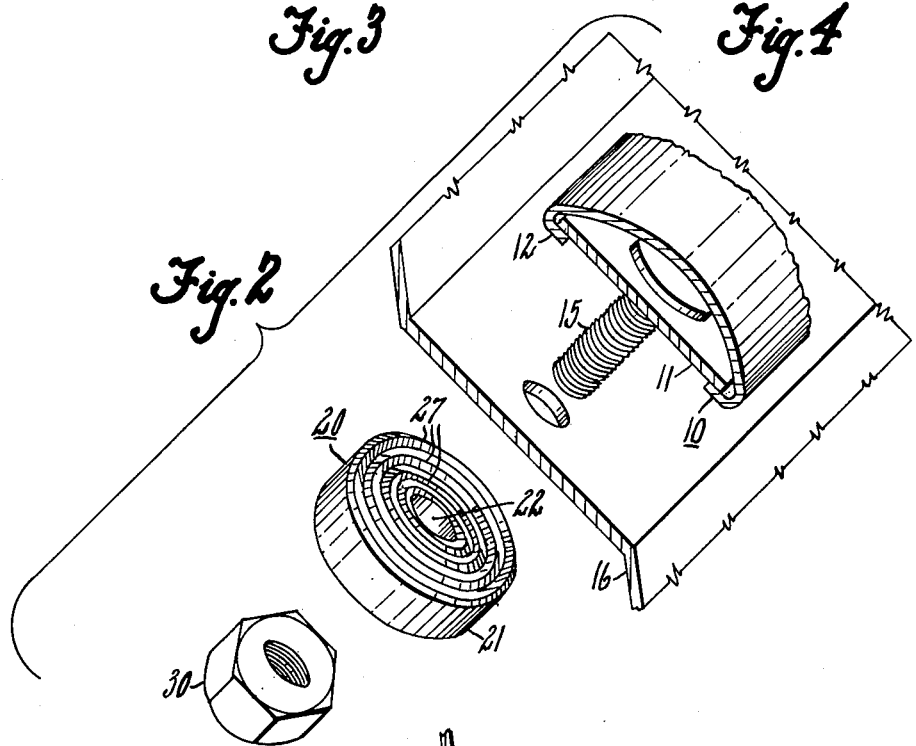
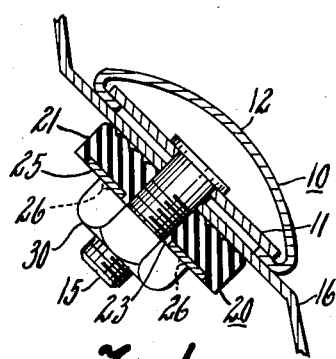
INVENTOR.
PAUL E. CLINGMAN
BY
Willets Hardman & Fehr
HIS ATTORNEYS

United States Patent Office 2,756,795
Patented July 31, 1956

2,756,795

RESILIENT LOCKING AND SEALING WASHER

Paul E. Clingman, Dayton, Ohio, assignor to General Motors Corporation, Detroit, Mich., a corporation of Delaware Application June 20, 1951, Serial No. 232,631

1 Claim. (Cl. 151—35)

This invention relates to torsionally resilient lock washers for threaded studs or bolts.

An object of this invention is to provide an improved form of such a resilient lock washer which is economical to make, and which can be simply pressed over its threaded stud or bolt and be retained thereupon by its frictional hold upon said stud or bolt, to thereby facilitate the assembling of the connected parts.

In making automobile bodies it is common practice to attach decorative trim strips to sheet metal portions of the body by a series of threaded studs or bolts projecting from the trim strip and passing thru holes in the sheet metal portion and having nuts threaded upon the inner ends of said studs (or bolts) to clamp the trim strip in place. A large number of such nuts and washers are usually required for mounting the various trim strips on one automobile body. The nuts and washers must be applied from the interior side of the sheet metal body panel. Often the studs must be located in such nearly inaccessible or otherwise difficult positions that it requires considerable effort and time for the assembler to apply the washer to the stud and then hold the washer from falling off (or from being forced off by the outward springing of the trim strip) until he can start the nut on the threaded stud. Any device that will simplify and facilitate the attachment of such trim strips will be of great aid on present day body assembly lines. The resilient washer of this invention can be easily and quickly pressed with one hand over the threaded stud and will then hold the stud temporarily in place (due to the considerable frictional hold of the washer thereupon) without danger of the trim strip falling off or being easily forced off.

Another object is to provide a simple form of unitary torsionally resilient washer having a locking surface of metal which effectively retains the nut against loosening after said nut is tightened to a materially less degree than is necessary with ordinary lock washers.

Another object is to provide a simple form of a unitary torsionally resilient washer having means therein to effectively seal and prevent leakage of moisture around the washer.

Further objects and advantages of the present invention will be apparent from the following description, reference being had to the accompanying drawings wherein a preferred embodiment of the present invention is clearly shown.

In the drawings:

Fig. 1 is a cross section illustrating a trim strip clamped to an automobile body panel by means of the threaded stud and resilient lock washer of this invention.

Fig. 2 is an exploded perspective view of the parts of Fig. 1.

Fig. 3 is a face view of the resilient washer.

Fig. 4 is a section taken on line 4—4 of Fig. 3.

Similar reference characters refer to similar parts throughout the several views.

The moulding or trim strip 10 shown in Figs. 1 and 2 is formed from an inner flat metal strip 11 around the margins of which the overlying decorative metal strip 12 is clinched as shown in the drawings. Prior to assembling strips 11 and 12 together the threaded studs 15 are inserted thru holes in or otherwise suitably fixed to strips 11 (preferably by welding) and spaced along the length thereof sufficiently close together to hold the trim strip firmly in place upon the outside sheet metal panel 16 of the automobile body. Trim strips 10 are usually several feet in length and preferably are made of such light gauge sheet metal that they may be readily flexed to accurately conform to the curving contour of the automobile panel at the time the strip is being assembled thereupon. Of course trim strips 10 may be made in curved form and in any desired width and may vary in sectional shape, and any one strip may taper or otherwise vary in cross section along the length thereof as may be desired to give the desired decorative effect.

The resilient washer 20 has a body 21 of resilient rubber or other well-known rubber-like material. The metal washer 25 is preferably bonded to the resilient body 21 by vulcanization in situ. Washer 25 is preferably located in the mold cavity as an insert and the body 21 is molded directly thereupon. Washer 25 may be a surface-roughened flat steel washer if so desired, but preferably washer 25 has one or several very small projections 26 struck up from the metal thereof (two projections 26 being shown in Fig. 4 in exaggerated size) on the outer surface thereof which is engaged by the nut 30. Now when the nut 30 is tightened against washer 25 the resilient rubber body 21 will be compressed in thickness to permit the rotating nut 30 to slide over the projections 26 without turning the washer 25. However these projections 26 (preferably directed angularly in the proper direction for this purpose) will tend to bite into the metal of nut 30 upon any reverse turning thereof, this being due to the pressure maintained between nut 30 and washer 25 by the compressed resilient body 21. The rubber body 21 has on its surface opposite the washer 25 the molded circular corrugations 27 which provide a more perfect seal to prevent leakage of water around bolts 15 into the inside of panel 16. These corrugations 27 greatly increase the frictional hold between rubber body 21 and panel 16 while nut 30 is being tightened against washer 25. Further, this frictional hold between body 21 and panel 16 will thereafter prevent the unitary washer 20 as a whole from turning relative to panel 16, and since nut 30 is held against turning relative to metal washer 25 as above described the combination will effectively prevent nut 30 from working loose at any later time. It will be noted that since the rubber body 21 obviously can yield torsionally about the axis of stud 15, it is possible for nut 30 to rotate in a loosening direction thru a substantial angle without any relative sliding either between nut 30 and washer 25 or between body 21 and panel 16. Such a loosening rotation of nut 30 will be resisted by the resilient torsional twist in the resilient rubber body 21, which torsional twist will again tighten nut 30 whenever opportunity presents at any later time and will always have a tendency to do so. Thus the entire unitary washer 20 serves as a torsionally resilient lock washer for nut 30, and will effectively hold nut 30 against loosening even though said nut is only slightly tightened thereagainst. This feature saves a lot of time and effort when assembling such trim strips on an automobile body assembly line since it is not necessary that the many nuts 30 be drawn tightly home with a wrench.

Another advantage in use of washer 20 is as follows. The central hole 22 of the resilient rubber body 21 is molded with a diameter slightly smaller than that of the threaded stud 15 so that when the unitary washer 20 is simply pressed upon stud 15 the threads thereof will distort and readily form threads in the resilient rubber, and provide a sufficiently strong hold thereupon to yieldably retain the parts temporarily in place and permit the nuts 30 to be applied later after the entire trim strip 10 has been precisely located on the panel 16. It will be noted that the diameter of the central hole in metal washer 25 is only slightly larger than that of hole 22 in rubber body 21 and thus leaves a small annulus 23 of resilient material between washer 25 and stud 15. The relatively small radial dimension of annulus 23 will obviously cause the resilient material of said annulus to be highly compressed and outwardly distorted when washer 20 is forced over stud 15 as above described. This high compression and outward flowing of the resilient material of annulus 23 greatly increases the above described temporary frictional hold of washer 20 upon the threaded stud 15 beyond what this frictional hold would be if the thin steel washer 25 be omitted entirely and after the nut has been threaded into position against the metal washer the distorted resilient material will seat against the beginning threads of the nut thereby sealing and protecting the threads against moisture that might flow from the threaded member.

While the embodiment of the present invention as herein disclosed, constitutes a preferred form, it is to be understood that other forms might be adopted.

What is claimed is as follows:

A unitary torsionally resilient lock washer for holding a threaded member projecting through an aperture in a base and nut for connecting two elements one to the other, comprising; a molded body of resilient rubber-like material having a central aperture of such size as to fit snugly with a resilient frictional hold upon said threaded member, said molded body having a series of concentric corrugations on a bottom surface adapted to engage said base and surround the aperture therein for forming a seal to prevent moisture leakage around the threaded member and through the aperture in said base, a relatively thin metal annulus bonded by vulcanization to said resilient molded body, said annulus forming a nut engaging surface on the top surface of the unitary lock washer, said metal annulus having the diameter of its central hole larger and the external diameter less than the respective diameters of the resilient molded body to which it is bonded and partially embedded in said resilient body so one surface only is exposed and said exposed surface is flush with the top surface of said body, said metal annulus having sharp projections extending above its exposed surface for effectively locking the nut against loosening rotation relative to said metal annulus, said resilient molded body having a body portion surrounding the central hole of said washer and projecting to form a portion of the top surface of said body to engage and seal a portion of said nut from the threaded member and to yieldably lock said nut against loosening rotation relative to said resilient body after said nut has been tightened sufficiently to axially compress said resilient molded body between said base and nut.

References Cited in the file of this patent

UNITED STATES PATENTS

| | | |
|---|---|---|
| 77,954 | Brocard | Mar. 19, 1868 |
| 207,275 | Hoffecker | Aug. 20, 1878 |
| 326,345 | Taylor | Sept. 15, 1885 |
| 945,127 | Kollenberg | Jan. 4, 1910 |
| 1,083,471 | Walton et al. | Jan. 6, 1914 |
| 1,208,620 | Moser | Dec. 12, 1916 |
| 2,235,429 | Henry | Mar. 18, 1941 |
| 2,456,262 | Fields | Dec. 14, 1948 |
| 2,643,904 | Wehmanen | June 30, 1953 |

FOREIGN PATENTS

| | | |
|---|---|---|
| 4,888 of 1931 | Australia | Nov. 11, 1931 |
| 168,094 | Great Britain | Aug. 15, 1921 |
| 468,046 | Great Britain | June 21, 1937 |